United States Patent [19]

Tsuboi

[11] Patent Number: 4,457,187

[45] Date of Patent: Jul. 3, 1984

[54] BURGLARPROOF APPARATUS FOR INTERNAL COMBUSTION ENGINE

[75] Inventor: Masaharu Tsuboi, Sayama, Japan

[73] Assignee: Honda Giken Kogyo Kabushiki Kaisha, Tokyo, Japan

[21] Appl. No.: 214,649

[22] Filed: Dec. 10, 1980

[30] Foreign Application Priority Data

Dec. 12, 1979 [JP] Japan ................................ 54-160264
Dec. 13, 1979 [JP] Japan ................................ 54-160857

[51] Int. Cl.³ ......................... F02B 77/00; F16M 1/00; F16H 57/10; B60R 25/06

[52] U.S. Cl. ................................ 74/411.5; 74/606 R; 70/192; 70/236; 70/245; 70/247; 123/198 B; 123/195 C

[58] Field of Search ................. 70/192, 236, 245, 247; 74/527, 606 R, 411.5; 123/198 B, 195 C; 180/287

[56] References Cited

U.S. PATENT DOCUMENTS

| | | | |
|---|---|---|---|
| 1,261,226 | 4/1918 | Gilbough | 70/247 |
| 1,360,338 | 11/1920 | Werdhoff | 70/247 |
| 1,394,357 | 10/1921 | Rose | 70/245 |
| 1,464,328 | 8/1923 | Morinsky | 70/245 |
| 1,530,801 | 3/1925 | Akin | 70/245 |
| 1,564,220 | 12/1925 | Dumas | 70/245 |
| 1,613,698 | 1/1927 | Flint et al. | 70/245 |
| 1,645,192 | 10/1927 | Hunt | 70/247 |
| 4,329,953 | 5/1982 | Row | 123/198 B |

FOREIGN PATENT DOCUMENTS

| | | | |
|---|---|---|---|
| 726398 | 3/1955 | United Kingdom | 70/245 |
| 741513 | 12/1955 | United Kingdom | 70/245 |

*Primary Examiner*—Lawrence J. Staab
*Assistant Examiner*—Michael D. Bednarek
*Attorney, Agent, or Firm*—Armstrong, Nikaido, Marmelstein & Kubovcik

[57] ABSTRACT

An internal combustion engine such as that used on a motorcycle is made burglarproof by making inoperable any one of a number of movable engine parts. Externally a key is used to lock such engine elements as the crankshaft, drive shaft, transmission components, shift components and clutch components. A locking means is also disclosed that prevents the two engine casings from being taken apart.

10 Claims, 18 Drawing Figures

BURGLARPROOF APPARATUS FOR INTERNAL COMBUSTION ENGINE

BACKGROUND OF THE INVENTION

1. Field of the Invention

This invention relates to a burglarproof apparatus for an internal combustion engine and, in particular, for a vehicle such as a motorcycle or the like.

2. State of the Prior Art

It has been usual hitherto that burglary prevention of a motorcycle or its engine is achieved by providing a lock means such as a steering lock or the like on the vehicle body.

With this type of preventive arrangement there is a possibility that the engine might be stolen by being detached from the vehicle body and can be used as it is. Thus, it is desirable that the engine be configured so as not to be usable even if detached from the vehicle body.

Further, it has been usual hitherto with an engine of this kind that the outer case thereof such as a crank case or the like is composed of at least two divided sections, and the two divisional sections are fastened together, for instance, by bolts in order that internal parts thereof may be accessible for inspection, repair or the like. The engine with this separable case construction is vulnerable in that the internal parts thereof are easily stolen and the stolen engine has a possibility of being disassembled for reconstruction. Accordingly, for a burglarproof means to be effective the divisional portions of the case should be so arranged as to be inseparable from each other.

SUMMARY OF THE INVENTION

This invention provides an apparatus that eliminates the vulnerable features mentioned above and is characterized by a case, such as a crank case or the like of an internal combustion engine, that is provided with a lock means such as a cylinder lock or the like operable by a key so that at least one of the movable members of the engine may be locked by the lock means into an inoperable condition.

This invention also provides an apparatus that eliminates another vulnerable feature, and it is characterized in that, in the foregoing type of apparatus in which the case is divided into at least two divisional sections, the divisional sections are so arranged that when the locking means is brought into its locked position, they are locked together, inseparably, by the locking means.

DESCRIPTION OF THE PREFERRED EMBODIMENTS

Figure 2:
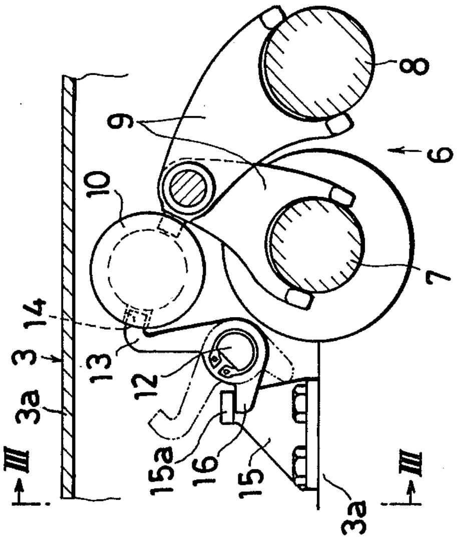
FIG. 2 is an enlarged view of a portion of the internal components shown in FIG. 1.

Referring to the drawings, numeral 1 denotes an internal combustion engine, and the engine 1 comprises a cylinder 2 forming its upper portion and a crank case 3 forming its lower portion, and the crank case 3 is extended long sideways, so that a transmission case is formed integrally therewith.

The interior of the case 3 contains various kinds of movable members of the engine 1. For instance, a crankshaft 4, an intermediate driving shaft 5 connected to the crankshaft 4, and a transmission mechanism 6 connected to the driving shaft 5 are contained therein, and the transmission mechanism 6 comprises an input shaft 7, an output shaft 8, and a shift drum 10 for operating respective shift forks 9, 9 extending over the respective shafts 7, 8.

According to this invention, the case 3 is provided with a lock means 11 such as a cylinder lock or the like operable by a key so that at least one of the foregoing movable members may be locked into its inoperable condition by the lock means 11.

Figure 3:
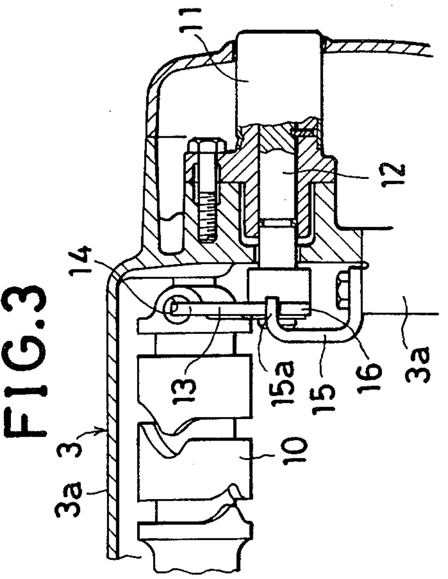
FIG. 3 is a sectional view taken along the line III—III in FIG. 2.
Figure 1:
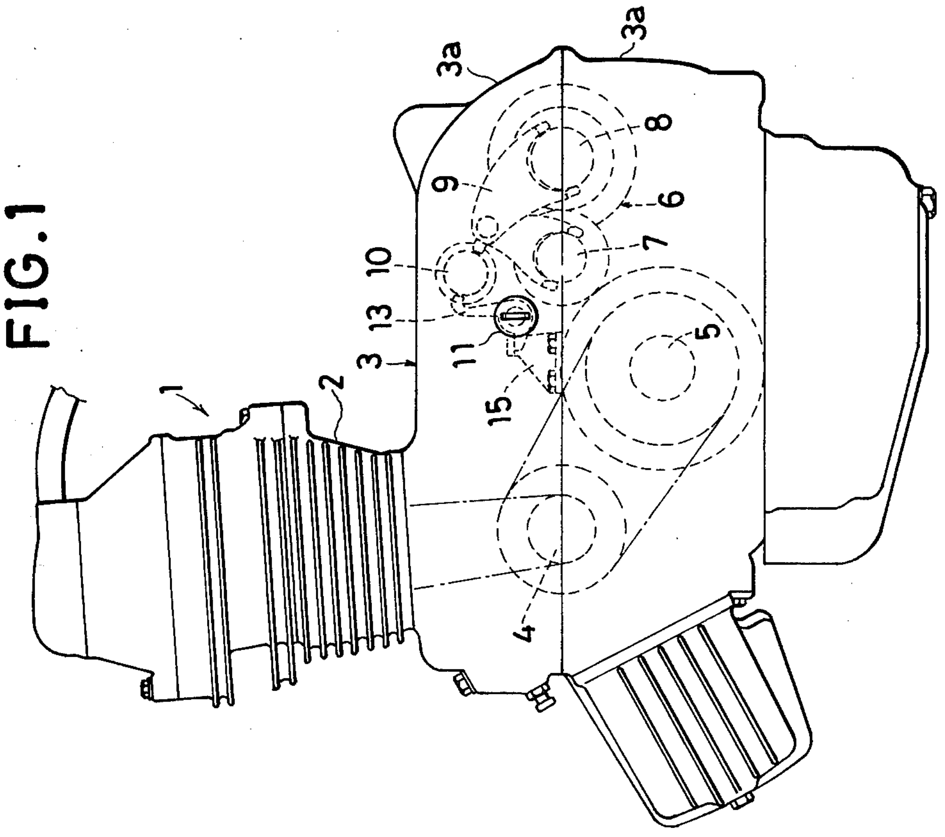
FIG. 1 is a side view of a typical motorcycle engine, schematically showing some internal components and embodying a first example of this invention.

In a first embodying example shown in FIGS. 1 to 3, the shift drum 10 is selected as the movable member to be locked. Namely the lock means 11 is attached by a bolt or the like to the side wall of the case 3, and a lock shaft 12 extending inwards from the lock means 11 is provided at its front end with a lock arm 13 projecting sideways therefrom, and the shift drum 10 is provided with a lock opening 14 at its side surface facing the lock arm 13. Thus, a driver of a vehicle such as a motorcycle or the like operates the lock means 11 by using a key (not shown) to be brought into its lock position when he leaves the vehicle. Thus, it the lock means 11 is in its lock position, the arm 13 is inclined from a position shown by dotted lines to a position shown by solid lines to be brought into engagement with the lock opening 14, and thereby the drum 10 is restricted in turning. In other words, the engine 1 becomes its inoperable condition at the shift drum 10 and is brought into burglarproof condition.

On the other hand, the engine 1 becomes operable only when the locking means 11 is unlocked by the key.

In this example, additionally, it is so constructed that when the shift drum 10 is locked, the case 3 is simultaneously so locked that divisional portions thereof cannot be separated from each other. Namely, the case 3 is of such a separable type that the same is divided into upper and lower half portions 3a, 3a, and a bracket 15 extending upwards is fixed to the lower half portion 3a, and the lock means 11 is fixed to the upper half portion 3a, and additionally the lock arm 13 is provided with a second lock arm 16. Thus, simultaneously when the lock means 11 is brought into its lock position, the arm 16 is brought into engagement with a lower surface of a claw member 15a formed on an upper end of the bracket 15, and thereby the two half portions 3a, 3a are locked together so as to be inseparable, and the engine 1 is in its burglarproof condition and also, the engine 1 is brought in such a condition that the stolen engine cannot be separated and disassembled.

Figure 5:
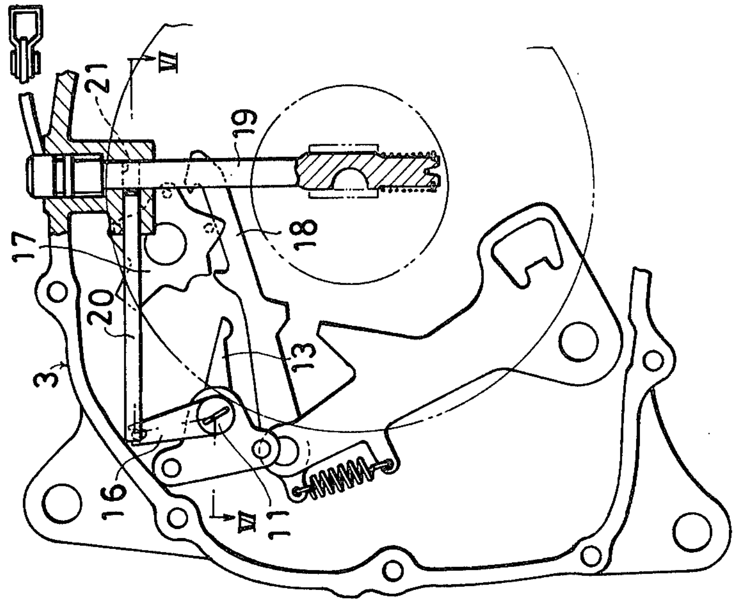
FIG. 5 is an enlarged view of a portion of the internal components shown in FIG. 4.
Figure 4:
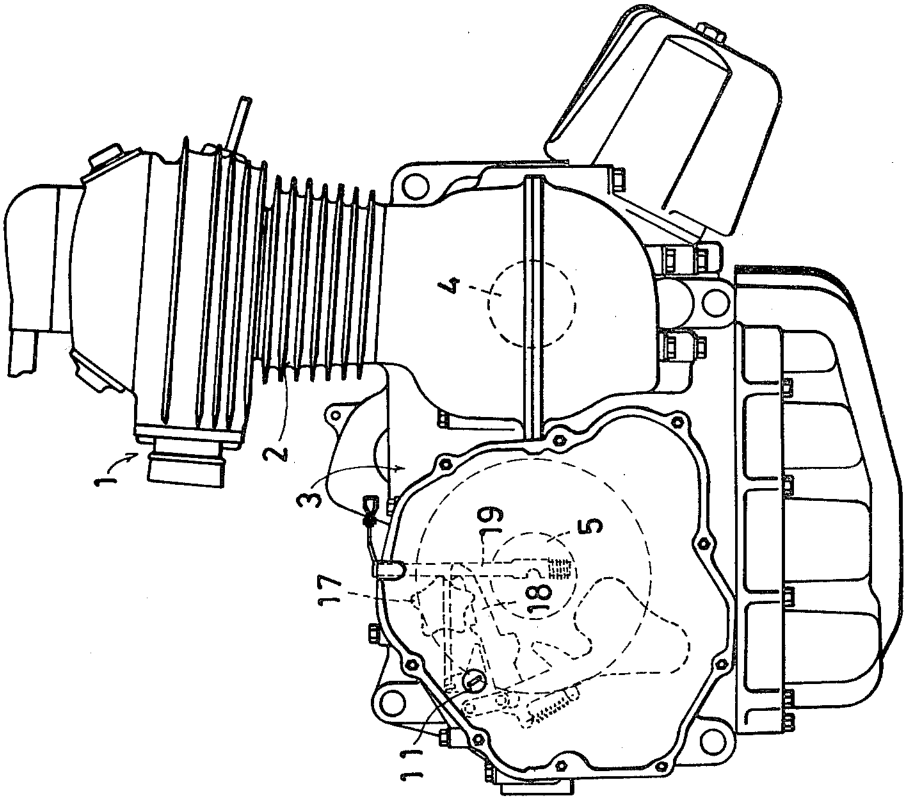
FIG. 4 is a side view of a typical motorcycle engine, schematically showing some internal components and embodying a second example of this invention.
Figure 6:
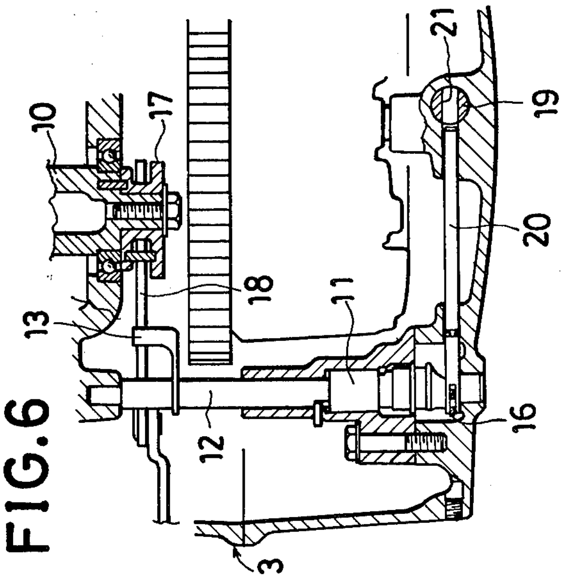
FIG. 6 is a sectional view taken along the line VI—VI in FIG. 5.

A second embodying example is shown in FIGS. 4 to 6. In this embodiment, the foregoing shift drum 10 is so arranged as to cooperate at a ratchet wheel 17 provided on one end thereof with a change arm 18 provided below the same, and there is provided on one end side of the drum 10 a clutch filter rod 19. In this example, the change arm 18 and the clutch lifter rod 19 are selected as the movable members to be locked. Namely, the lock means 11 is provided at a position different from that in the foregoing example, and the lock arm 13 thereof is located above the change arm 18, and the second lock arm 16 thereof is so positioned, at a lock rod 20 extending therefrom as to face a lock opening 21 made previously in the foregoing lifter rod 19. Thus, when the lock means 11 is brought into its lock position, the change arm 18 is pushed to move downwards by the same through the lock arm 13 and is brought into such an inoperable position that the same is disengaged from the ratchet wheel 17, and at the same time the lock rod 20 is moved thereby through the lock arm 16 and goes into the lock opening 21, so that the clutch lifter rod 19 is locked in that position. In other words, the engine 1 is locked in its inoperable condition at the change arm 18 and the clutch lifter rod 19, and is brought into a burglarproof condition.

Figure 7:
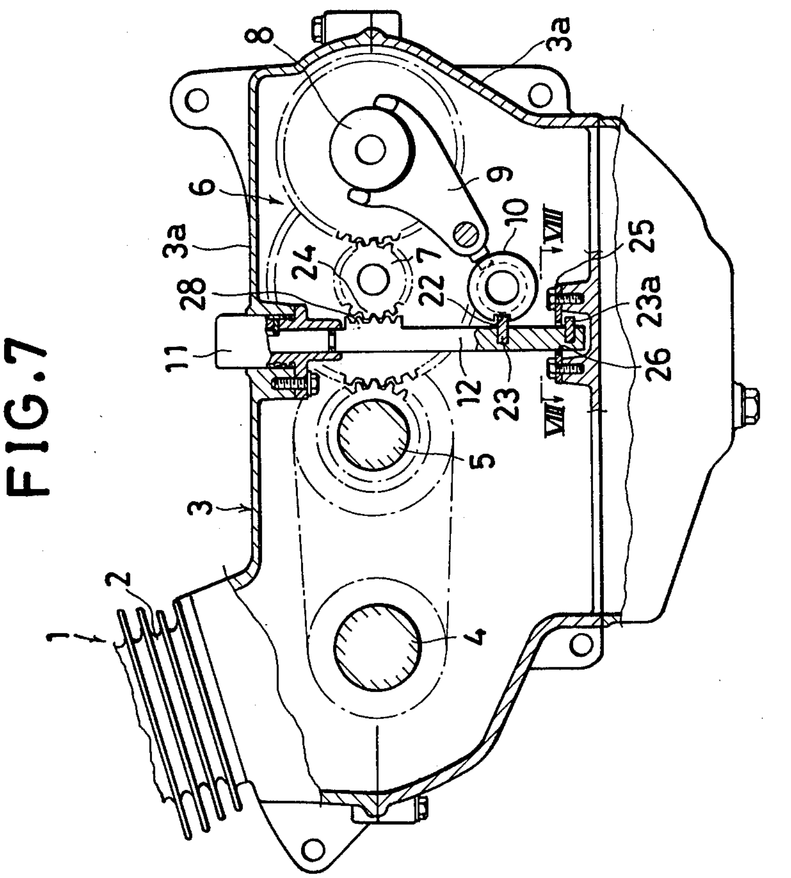
FIG. 7 is a sectional side view of a typical motorcycle engine embodying a third example of this invention.
Figure 8:
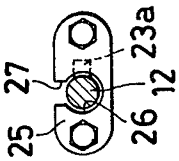
FIG. 8 is a sectional view taken along the line VIII—VIII in FIG. 7.

A third embodiment is shown in FIGS. 7 and 8.

In this embodiment, the engine 1 is somewhat different in style from those in the foregoing examples, and, namely, the shift drum 10 is located below the transmission mechanism 6. In this case, the shift drum 10 and a transmission gear of the transmission mechanism 6 are selected as the movable members to be locked. Namely, the lock means 11 is provided on the top wall of the case 3 and the lock shaft 12 extends vertically downwards therefrom, and the shaft 12 is provided with a lock pin 23 which is to be brought into engagement with a lock opening 22 made in a side surface of the drum 10 and a gear-teeth shaped member 28 which is to be brought into engagement with the transmission gear 24 of the transmission mechanism 6. Thus, when the lock means 11 is brought into its lock position, as illustrated, the pin 13 is brought into engagement with the pin opening 22 and the gear-teeth shaped member 28 is meshed with the gear 24, so that the drum 10 and the gear 24 is brought in their locked conditions. Also in this example, it is so constructed that the case 3 is so arranged as to be locked to be in inseparable condition. Namely, the lock means 11 is fixed to the upper half portion 3a and a hanger plate 25 is fixedly provided on the lower half portion 3a, and an opening 26 is made in the plate 25 so that the shaft 12 is passed therethrough and a cut-out portion 27 extending sideways from the opening 26, and the shaft 12 is provided at its portion located below the opening 26 with a second lock pin 23a which is nearly in conformity with the cut-out portion 27. Thus, when the lock means 11 is brought into its lock position, the lock pins 23a comes out of its alignment with the cut-out portion 27 and is brought into engagement with the lower surface of the surrounding edge portion of the opening 26, and accordingly the two half portions 3a, 3a are locked together.

Figure 9:
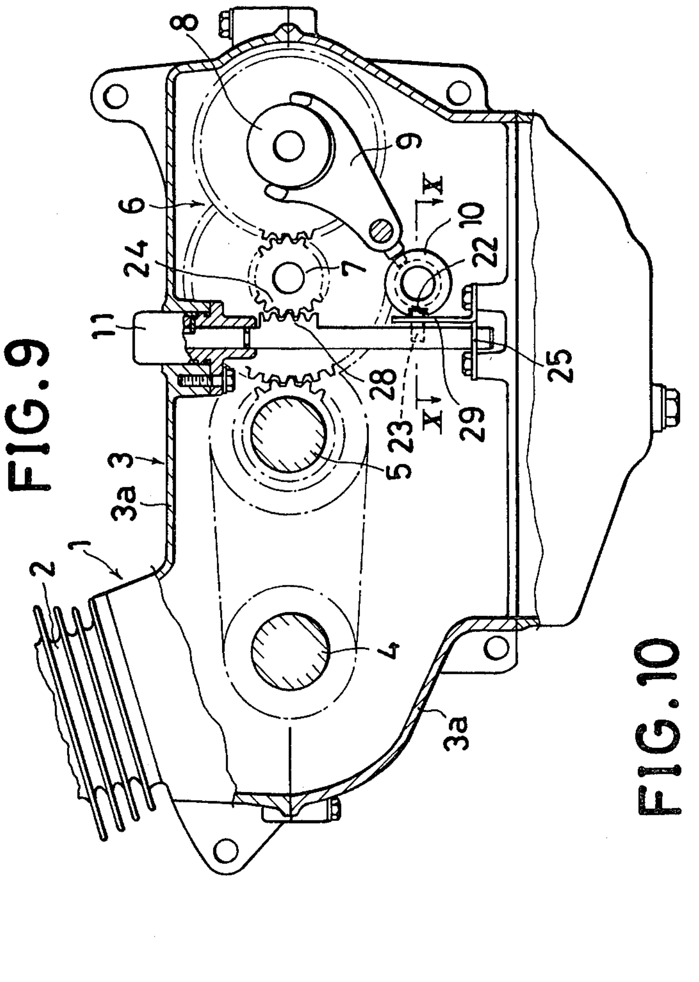
FIG. 9 is a sectional side view of a typical motorcycle engine embodying a fourth example of this invention.
Figure 11:
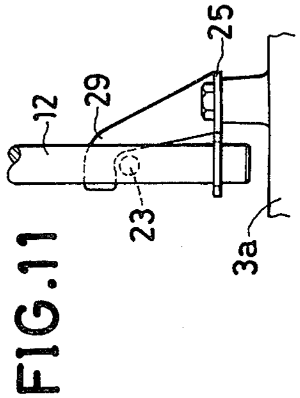
FIG. 11 is a left side view of the lower part of locking means 11 shown in FIG. 9.
Figure 10:
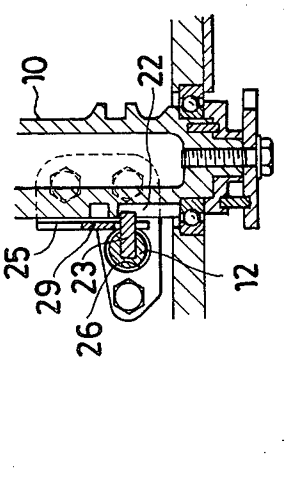
FIG. 10 is a sectional view taken along the line X—X in FIG. 9.

The fourth embodiment shown in FIGS. 9 to 11 is a modification of the above example. Namely, the hanger plate 25 is provided with a claw member 29 bent to extend upwards until it reaches one side of the drum 10. Thus, the lock pin 23 is to be brought into engagement with both the lock opening 22 of the drum 10 and the claw member 29 of the plate 25, and consequently the second lock pin 23a as provided in the above example can be omitted.

It is desirable that the lock means 11 cannot be detached by being accessible thereto from the exterior, and for achieving this purpose, the same is fixed by a bolt or the like to the internal surface of the case 3 as shown clearly, for instance, in FIGS. 6 and 7 or FIG. 9.

Figure 12:
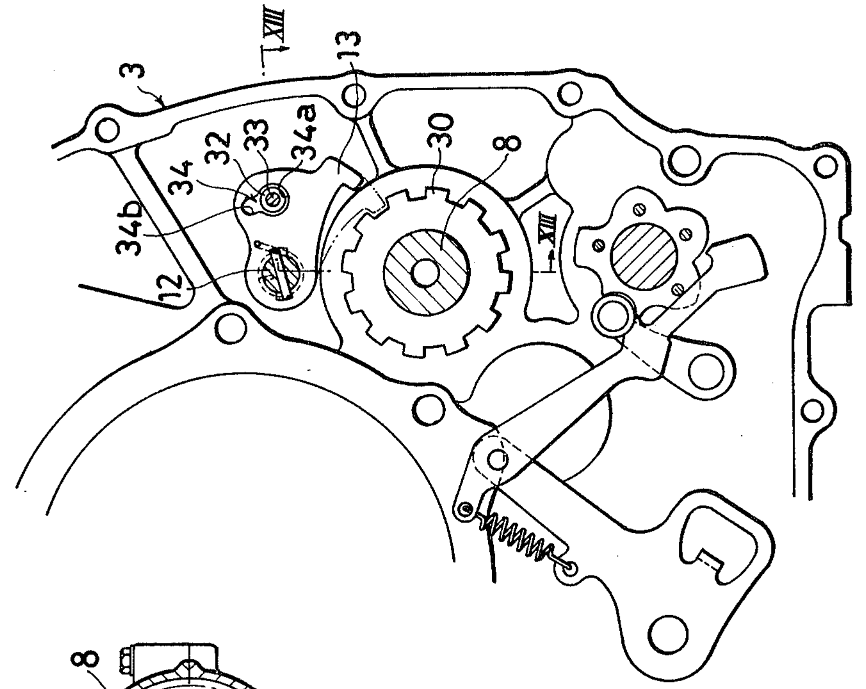
FIG. 12 is a sectional side view of another engine embodying a fifth example of this invention.
Figure 13:
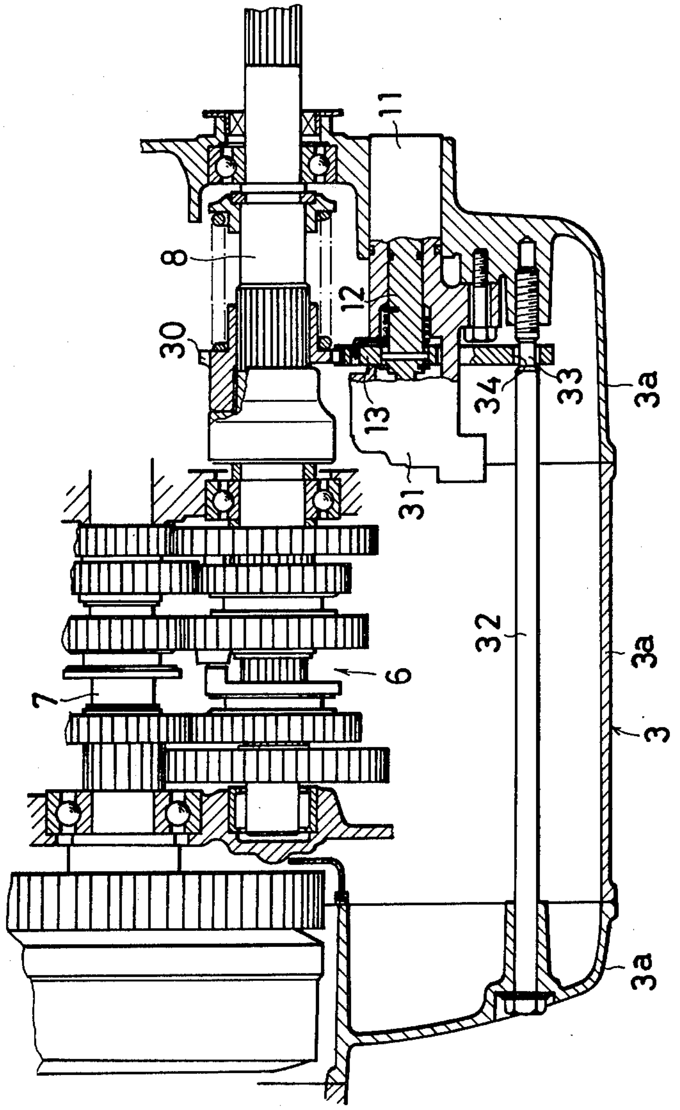
FIG. 13 is a sectional view taken along the line XIII—XIII in FIG. 12.

The fifth embodiment is shown in FIGS. 12 and 13 is applied to another type of engine 1 which is further somewhat different in type from that in the above example, and in this example the output shaft 8 is selected as the movable member to be locked.

The case 3 of the engine comprises an intermediate portion 3a, a front cover portion 3a, and a rear cover portion 3a, and the lock means 11 is fixed to the rear cover portion 3a, and the lock arm 13 provided on the front end portion of the lock shaft 12 extending forwards from the lock means 11 is so arranged as to be brought into engagement with a lock wheel 30 on the output shaft 8. In this case, the shaft 12 is provided at its front end with an electric switch 31 arranged to be operable therewith and the switch 31 is interposed in an electric circuit such as an ignition circuit, a starter circuit or the like of the engine 1, so that when the lock means 11 is brought into its lock position, the switch 31 is opened to cause simultaneously the circuit to be inoperable. The lock to the casing 3 is also carried out. Namely, a lock bolt 32 for fastening the three portions 3a, 3a, 3a together is inserted, at its contracted portion near the rear end thereof, through an opening 34 made in the lock arm 13, and the opening 34 is formed into one comprising a large diameter region 34a on one side thereof and a small diameter region 34b on the other side, so that when the lock means 11 is brought into its lock position, the small diameter region 34b is brought to be mounted on the contracted portion 33 and this prevents the bolt 32 from coming out, and accordingly the case 3 is so locked as to be inseparable.

Figure 15:
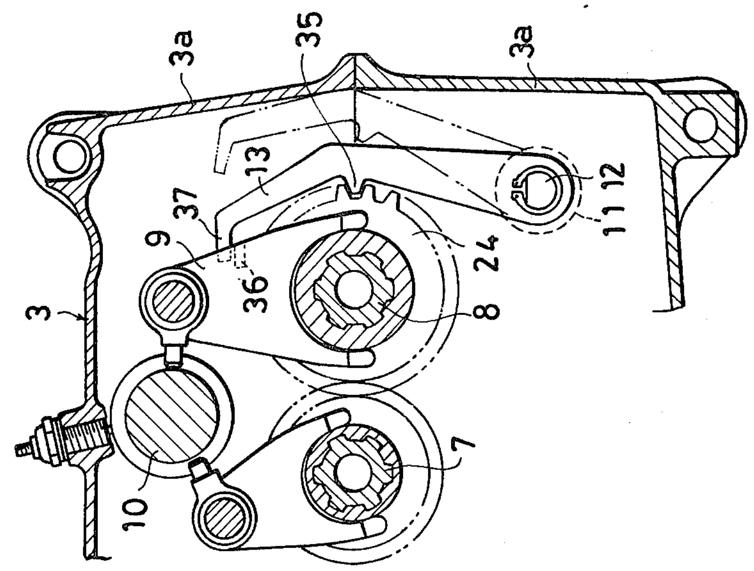
FIG. 15 is a sectional view taken along the line XV—XV in FIG. 14.
Figure 14:
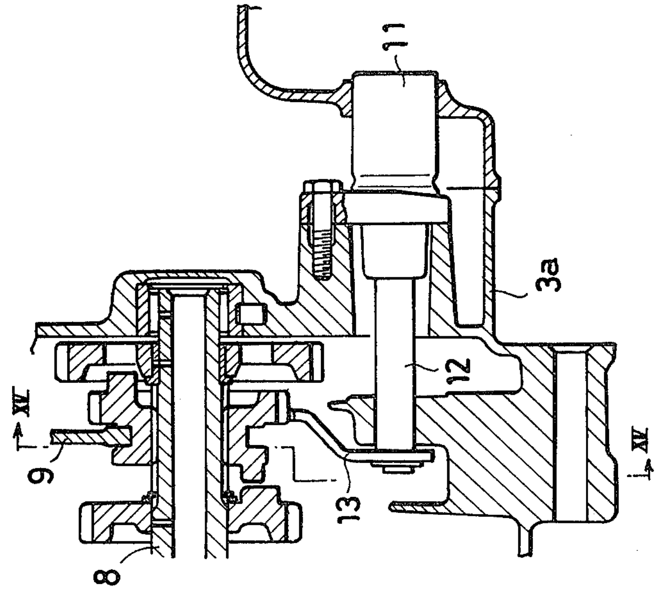
FIG. 14 is a sectional side view of another engine embodying a sixth example of this invention.

In the sixth embodiment shown in FIGS. 14 and 15, the shift fork and the transmission gear 24 are selected as the movable members to be locked. Namely, the lock arm 13 connected to the lock means 11 is provided with a first projection 35 arranged to be in engagement with the gear 24 and a second projection 37 arranged to be in engagement with a claw member 36 on the side surface of the fork 9 so that the gear 24 and the fork 9 may be locked. Here the case 3 is also arranged to be locked. Namely, the lock means 11 is provided on the lower half portion 3a and the shift fork 9 is pivotally provided on the upper half portion 3a so that the two half portions 3a may be locked together by the engagement between the claw member 36 and the projection 37.

Figure 17:
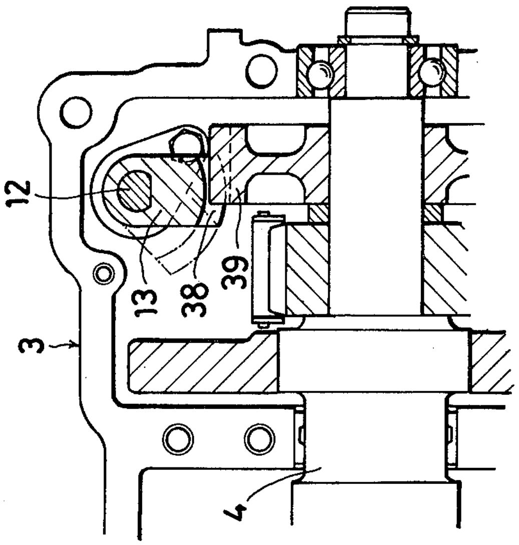
FIG. 17 is a sectional view taken along the line XVII—XVII in FIG. 16.
Figure 16:
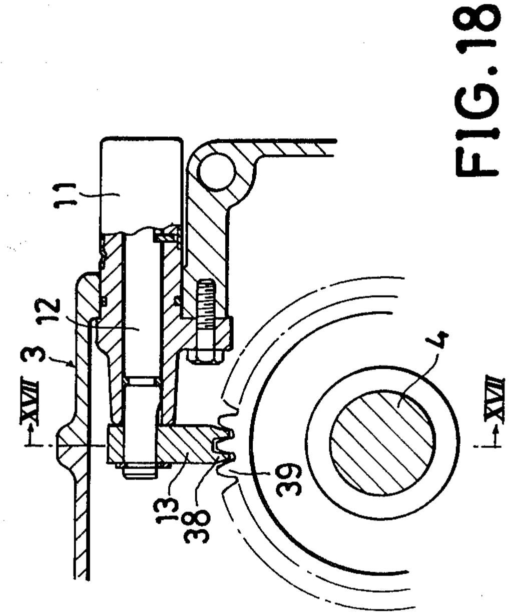
FIG. 16 is a sectional side view of another engine embodying a seventh example of this invention.

In the seventh embodiment shown in FIGS. 16 and 17, the crankshaft 4 is selected as the movable member to be locked. Namely, the lock arm 13, arranged to be moved with the lock means 11 is formed at its front end portion into a gear-teeth shaped member 38 and the gear-teeth shaped member 38 is so arranged as to be in engagement with an ACG gear 39 on the crankshaft 4.

Figure 18:
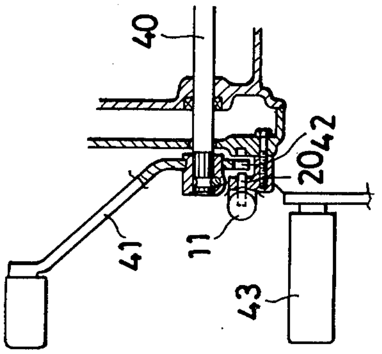
FIG. 18 is a sectional view of another engine embodying an eighth example of this invention.

In the eighth embodiment shown in FIG. 18, a change pedal 41 on one end portion of a spindle shaft 40 for operating the shift drum 10 is selected as the movable member to be locked. Namely, the lock means 11 is provided with the lock rod 20 extending therefrom and a lock opening 42 facing the same is made in the rear end portion of the change pedal 41 provided on one end portion of the shift spindle 40. Thus, when the lock means 11 is brought in its lock position, the rod 20 is moved into the opening 42 for locking the pedal 41. Numeral 43 denotes a step extending outwards from a position below the lock means 11.

Though not illustrated, such a modification can be considered that a cam or a cam chain is selected as the movable member to be locked.

Thus, according to this invention, the engine is provided on its case with locking means so that any selected one or more of the movable members of the engine may be locked. In this manner, the engine can be brought into an inoperable condition by locking the movable member, and thus there is brought about the advantage that the engine cannot be used even if the same is detached from the vehicle body, and the apparatus includes another deterent to being burglarized.

Another important feature of this invention is that the case of the engine is always locked in its inseparable condition. This prevents the burglarizing of internal engine parts and also the locked case prevents a stolen engine from being disassembled for reconstruction. Thus, this invention provides an additional deterrent to effective burglary.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. A burglarproof apparatus for an internal combustion engine characterized in that a case such as a crank case or the like of an internal combustion engine is provided with a lock means such as a cylinder lock or the like operable by a key so that at least one of the movable members of the engine may be locked by the lock means into its inoperable condition, the case is divided into at least two sections, said lock means being mounted on one of the sections and the divisional sections are so arranged that when a lock means is brought into its locked position, they are locked together inseparably by the lock means directly engaging a portion of the other section.

2. A burglarproof apparatus as claimed in claim 1, wherein the case comprises a crank case having a transmission case extending integrally therefrom sideways, and the movable members comprise a crankshaft, an intermediate driving shaft connected to the crankshaft, such constructional components of a transmission mechanism connected to the driving shaft as an input shaft, an output shaft, a transmission gear, a shift fork, a shift drum, a change arm, a shift spindle, a change pedal, a clutch lifter rod or the like.

3. A burglarproof apparatus as claimed in claim 2, wherein the case is divided into two divisional sections and comprise upper and lower half sections, and the lock means is fixed to the upper half section, and a lock shaft extending inwards from the lock means is provided on its front end with a lock arm, and a cooperating lock opening is made in a facing surface of the shift drum, and the lock arm is provided with a second lock arm, and a cooperating claw member is fixed to the lower half section.

4. A burglarproof apparatus as claimed in claim 1, wherein a lock arm extending inwards from the lock means is positioned above the change arm and is provided with a lock rod arranged to cooperate with a lock opening made in the clutch lifter rod.

5. A burglarproof apparatus as claimed in claim 1, wherein the two divisional sections comprise upper and lower half sections, and the lock means is fixed to the upper half section, and a lock shaft extending downwards from the lock means is provided with a lock pin arranged to cooperate with a lock opening made in a facing surface of the shift drum and also with a gear-teeth shaped member arranged to be meshed with the transmission gear, and a hanger plate arranged to cooperate with the lock shaft is fixed to the lower half section.

6. A burglarproof apparatus as claimed in claim 5, wherein the hanger plate has a claw member protruding upwards along the side surface of the shift drum, and the lock pin is arranged to cooperate also with the claw member.

7. A burglarproof apparatus as claimed in claim 1, wherein the divisional sections comprise an intermediate section, a front cover section and a rear cover section, and the lock means is fixed to the rear cover section, and a lock shaft extending therefrom forwards has a lock arm arranged to cooperate with a lock wheel mounted on the output shaft, and the lock arm is provided with an opening comprising a large diameter region on one side and a small diameter region on the other side, and a lock bolt for fastening the three divisional sections together is provided at its rear end section with a contracted section and is arranged to be in engagement at that section with the foregoing opening.

8. A burglarproof apparatus as claimed in claim 1, wherein the two divisional sections comprise upper and lower half sections, and the lock means is fixed to the lower half section, and a lock arm extending from the lock means is provided with a first projection arranged to cooperate with a claw member provided on the side surface of the shift fork and with a second projection arranged to cooperate with the transmission gear, and the shift fork is pivotally supported on the upper half section.

9. A burglarproof apparatus as claimed in claim 1, wherein a lock arm arranged to move with the lock means is provided with a gear-teeth shaped member arranged to be in engagement with an ACG gear mounted on the crankshaft.

10. A burglarproof apparatus as claimed in claim 1, wherein a lock pin extending from the lock means is arranged to cooperate with a lock opening made in the rear end portion of the change pedal.

* * * * *